United States Patent [19]

Bosc et al.

[11] Patent Number: 5,182,783
[45] Date of Patent: Jan. 26, 1993

[54] PROCESS FOR MANUFACTURING A MONOMODE OPTICAL WAVEGUIDE MADE OF A POLYMER AND ENDOWED WITH ELECTROOPTIC PROPERTIES, AND SUCH AN OPTICAL WAVEGUIDE

[75] Inventors: Dominique Bosc, Lannion; Martine Guilbert, Trebeurden; Christian Toinen, Begard, all of France

[73] Assignee: France Telecom, Paris, France

[21] Appl. No.: 748,701

[22] Filed: Aug. 22, 1991

[30] Foreign Application Priority Data

Aug. 24, 1990 [FR] France ............................ 90 10635

[51] Int. Cl.⁵ ............................................ G02B 6/16
[52] U.S. Cl. .................................... 385/123; 385/2;
385/143; 385/145
[58] Field of Search ........................................ 385/1–3,
385/123, 141–145

[56] References Cited

U.S. PATENT DOCUMENTS 5,076,658  12/1991  Hayden et al. ..................... 385/143

Primary Examiner—John D. Lee
Assistant Examiner—John Ngo
Attorney, Agent, or Firm—Blakely, Sokoloff, Taylor & Zafman

[57] ABSTRACT

The invention relates to a process for manufacturing a monomode cylindrical optical waveguide made of a polymer and endowed with electrooptic properties.

According to the invention, the manufacturing process comprises the following steps:

producing a cylindrical core rod (11) by polymerization of a mixture comprising a core polymer and an electrooptically active organic substance, forming a first preform (10) by coating the core rod (11) by means of an optical cladding (12) formed by a cladding polymer, fitting said first preform (10) into a first jacket (20) constituted by a jacket polymer, producing a second preform (30) by drawing the first jacket (20), fitting the second preform (30) into a second jacket (40) made of a jacket polymer, producing means (41, 42, 43, 44) for positioning electrodes for excitation of the active substance, fiber drawing the second jacket (40) until the core diameter ($d_c$) has the required dimension in order for the optical waveguide obtained to be monomode, producing said electrodes.

25 Claims, 3 Drawing Sheets

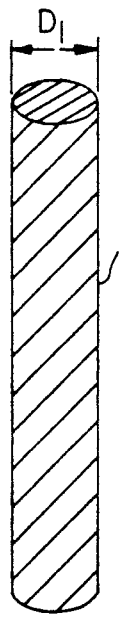
FIG. 1a
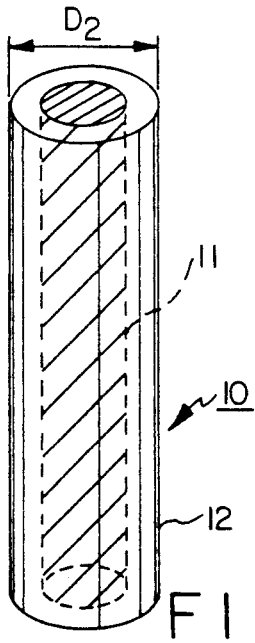
FIG. 1b
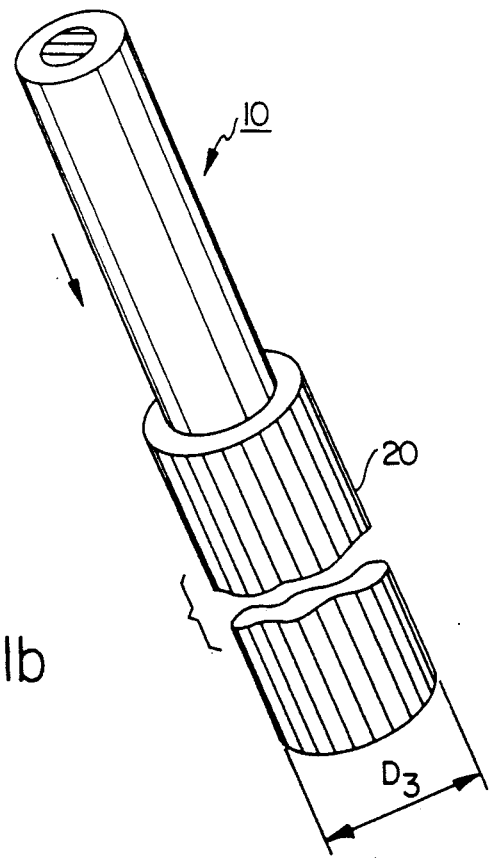
FIG. 1c
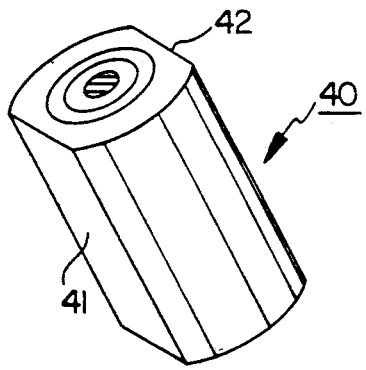
FIG. 1f
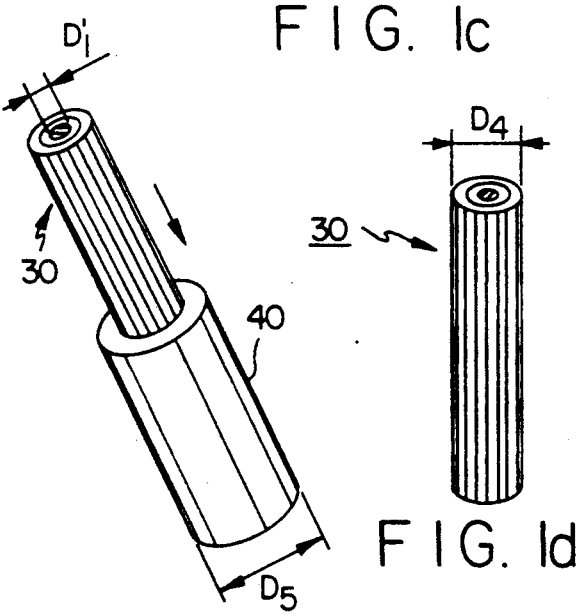
FIG. 1e
FIG. 1d
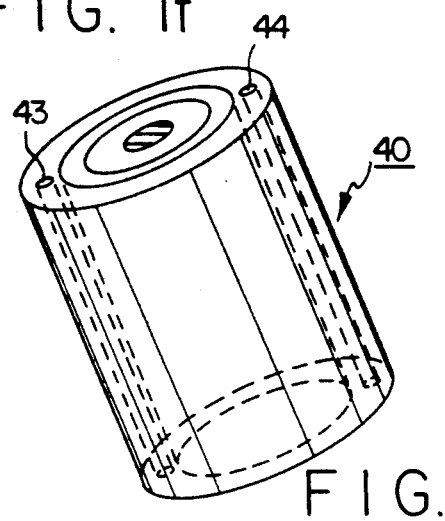
FIG. 1g

PROCESS FOR MANUFACTURING A MONOMODE OPTICAL WAVEGUIDE MADE OF A POLYMER AND ENDOWED WITH ELECTROOPTIC PROPERTIES, AND SUCH AN OPTICAL WAVEGUIDE

The present invention relates to a process for manufacturing a monomode cylindrical optical waveguide made of a polymer, such a waveguide permitting a modulation, by electrooptic effect, of the light wave which it transmits. The invention also relates to a such a waveguide endowed with electrooptic properties.

The invention has a particularly advantageous application in the field of telecommunication by optical fibers and, especially, in the field of optical fibers operating in the near infrared, for example between 0.6 $\mu$m and 2 $\mu$m.

The general technical problem posed for all devices for telecommunication by optical fibers is to transmit the information which is desired to be sent in the form of a phase or amplitude modulation of the carrier wave, which here is the light wave. It is therefore necessary to provide means capable of producing the modulation sought or, more generally, of modifying the propagation properties of the light in a network of optical fibers.

One solution known for this technical problem consists in using the non-linear properties of the electric susceptibility of certain materials. The application of a strong electric field on a material of this type causes a variation in the refractive index of the medium, which modifies the phase of the light wave. If this field is modulated, the system operates as a phase or amplitude modulator by interference with a wave of fixed phase. Electrooptic modulators manufactured from inorganic single crystals, such as for example KDP, lithium niobate ($LiNbO_3$) or gallium arsenide, are known. However, these materials have a crystallogenesis which is often difficult to exploit and, in addition, they generally need to be conditioned in the form of optical waveguides so that they can be integrated in an assembly for telecommunication by fibers. This is why these components, although very efficient, are very expensive, their price being prohibitive for their use in a network of optical fibers. The modulation functions are also sometimes conducted at the source, that is to say by direct modulation, with the disadvantage that electrooptic conversion remote from the emitters is limited.

More recently, experiments have been carried out in order to obtain electrooptic effects, especially the Kerr effect, with silica fibers, see for example the article by J. M. Dziedzic et al. "Optical Kerr effect in long fibers" which appeared in Applied Optics, 20 (8), 1405 (1981). However, since silica has very low higher order electric susceptibilities, in particular the 3rd order susceptibility implied in the Kerr effect, the interaction lengths between the fiber and the electric field have to be considerable, from 30 to 50 m, which manifests itself in very narrow bandwidths related to the transit time of the optical wave in the interaction zone. By way of example, for 50 m of silica the transit time is 2.5 $\mu$s.

The emergence of polymeric optical fibers, an advantageous embodiment of which is given in the French Patent No. 2,557,495, offers interesting new possibilities with a view to obtaining optical waveguides with intense electrooptic effects, insofar as organic molecules, such as 2-methyl-4-nitroaniline, DEANS (4-diethylamino-4'-nitrostilbene), Disperse Red 1 (4-[N-ethyl-N-(2-hydroxyethyl)]amino-4'-nitroazobenzene), NPP N-(4-nitrophenyl-L-piolinol) or others as well, may exhibit non-linear electric susceptibilities of two orders of magnitude greater than those of silica for example. However, even though the unpublished French Patent Application No. 9,000,919 makes reference to a process for manufacturing a monomode polymeric optical fiber, no description was given of such fibers capable of producing electrooptic effects.

In addition, the technical problem, to be solved by the subject of the present invention, is to propose a process for manufacturing a monomode cylindrical optical waveguide made of a polymer, in accordance with the preamble, which would make it possible to obtain such an optical waveguide having a strong electrooptic power, whilst ensuring geometrical characteristics which are compatible with monomodality and meeting the requirements for connectability to standard monomode optical fibers made of silica, namely essentially the concentricity of the core of the guide in relation to the guide itself.

The solution to the technical problem posed consists in accordance with the invention in that said process comprises the following steps:
producing a cylindrical core rod by polymerization of a polymerizable mixture comprising especially a core polymer and an electrooptically active organic substance such that the core exhibits an optical activity under the action of an external electric field,
forming a first preform by coating the cylindrical core rod by means of an optical cladding formed by a cladding polymer,
fitting said first preform into a first jacket constituted by a jacket polymer,
producing a second preform by partial drawing of the first jacket containing the first preform,
fitting the second preform into a second jacket made of a jacket polymer,
fiber drawing the second jacket thus prepared until the core diameter has the required dimension in order for the optical waveguide obtained to be monomode,
producing electrodes for polarization and excitation of the electrooptically active substance.

In the specification which follows, fiber drawing a jacket will be understood to mean the reduction of the diameter of said jacket to the dimensions of an optical fiber by hot drawing.

Likewise, a monomode optical waveguide made of a polymer is, according to the invention, noteworthy in that it comprises:
a core formed by a mixture comprising especially a core polymer and an electrooptically active organic substance such that the core exhibits an optical activity under the action of an external electric field, the core diameter having the required dimension in order for the optical waveguide to be monomode,
an optical cladding made of a cladding polymer surrounding the core;
electrodes for polarization and excitation of the optically active substance.

Thus, because it may be manufactured in great quantity starting from inexpensive base materials, the optical waveguide produced according to the process, which is the subject of the invention, has a relatively moderate cost price. On the other hand, as the electrooptic properties of the active organic substance may be very significant, it is possible, for the same effect, to reduce substantially the interaction length corresponding to a specified peak control voltage, or conversely to reduce the peak voltage for a specified interaction length. Another advantage offered by the possibility of using a high electrooptic power resides in the considerable increase of the bandwidth of the optical waveguide which, under certain conditions, could be in gigahertz. Finally, it is necessary to stress that the process according to the invention leads to a monomode optical waveguide exhibiting an excellent concentricity of the core and guide diameters, meeting the conditions for matching to the "fiber optic" connectors utilized as standard.

The electrooptic effects in question here are of two types: the Pockels effect which involves the 2nd order electric susceptibility, $\chi^{(2)}$, of the material and produces a variation in the index of the medium proportional to $\chi^{(2)}E$, E being the applied electric field, while the variation in the index resulting from the Kerr effect is proportional to $\chi^{(3)}E^2$, $\chi^{(3)}$ being the 3rd order susceptibility of the material. Under certain circumstances, the 3rd order effects are insufficient or sometimes masked by non-electronic phenomena which are not rapid enough, as in polar molecules for example. This is why there is advantage, especially so as to be able to modulate the light at high frequencies, in enhancing the quadratic properties of the active substance in favor of the electrooptic Pockels effect. To this end, once the monomode fiber is obtained, there is provision for the molecules of the electrooptically active organic substance within the core to be oriented at a temperature close to the glass transition temperature of the core polymer under the action of an electric field which is subsequently held until the return to ambient temperature.

The polymers which may be utilized for forming the core of the optical waveguide are, for example, methacrylic polymers, polymethyl methacrylate in particular, α-haloacrylates, styrene polymers and carbonates and vinyl carbonates, which exhibit a glass transistion temperature Tg greater than 80° C. and a fiber drawing temperature between 150° and 300° C.

The electrooptically active organic substance must possess significant 2nd or 3rd order electric susceptibilities. This type of substance is characterized by a strong electron donating group connected to an accepting group by a conjugated system which, as a result, has a strong susceptibility $\chi^{(2)}$, or else by strongly conjugated molecules such as polyalkylthiophenes, polydiacetylenes and other conjugated polymers which exhibit a significant electronic susceptibility $\chi^{(3)}$.

These active substances may be simple molecules or monomers copolymerizable with the monomer of the core. In either case, it is necessary that the active molecule be soluble in the core monomer to the extent necessary for ensuring the effectiveness of the final polymer. Precautions must be taken in order that the electrooptically active substance does not inhibit the polymerization, is not transformed during the polymerization and does not cause crosslinking of the core polymer while being formed or when already formed, for example during the fiber drawing.

The active organic substance may be added to the core polymer in various ways: either by simple physical admixture in the polymer, which is called a "guesthost" structure, or else by chemical grafting onto the polymer or the monomer to be polymerized.

The description which will follow with reference to the attached drawings, given by way of nonlimiting example, will make the scope of the invention understood and how it may be carried out.

FIGS. 1a–1g are diagrammatic representations of the steps of the process according to the invention.

FIGS. 2a and 2b outline two modes of operation of a light guide produced with the help of the process according to the invention.

FIG. 3 is a perspective view of a light guide exhibiting polarization and excitation electrodes disposed on flats.

The process for manufacturing a monomode cylindrical optical waveguide made of a polymer, such a waveguide permitting a modulation, by electrooptic effect, of the light wave which it transmits, this process, represented diagrammatically in FIG. 1, comprises a first step of producing a cylindrical core rod 11 by polymerization of a polymerizable mixture comprising especially a core polymer and an electrooptically active organic substance such that the core exhibits an optical activity under the action of an external electric field.

The core polymer is produced, for example, starting from a mixture of two monomers: methyl methacrylate and ethyl methacrylate in the ratio of 100/0 to 80/20 mol per mole. The electrooptically active substance is generally composed of a molecule such that the core polymer exhibits a 2nd order susceptability greater than $3.3 \times 10^{-14}$ MKSA, after an orientation operation described in detail hereinbelow, or a 3rd order susceptibility greater than $1.1 \times 10^{-19}$ MKSA, at the wavelength in question. Among molecules which may be suitable, mention should be made of 2-methyl-4-nitroaniline (MNA) which possesses a good non-linear susceptibility and is quite soluble. MNA is sublimed at the rate of approximately 1 g/h at 90° C. and $2 \times 10^{-5}$ mbar and then introduced into the purification system, as described in French Patent No. 2,557,495, which is included by reference in the present application. The proportion of MNA may be chosen between 1 and 15% by weight of core polymer formed and preferably between 5 and 10%. By way of example, a mixture of 5% of MNA in polymethyl methacrylate possesses a susceptibility $\chi^{(3)}$ of $5.5 \times 10^{-21}$ MKSA compared to $3.3 \times 10^{-23}$ MKSA for silica for an approximately 1 μm optical wavelength. The polymerizable mixture also contains reagents such as a polymerization initiator, di-tert-butyl peroxide in the ratio of some 0.01 to 1 mol % per mole of comonomers and a transfer agent acting as a trap for free radicals which could attack the MNA. The transfer agent, which can be for example a mercaptan such as laurylmercaptan or n-butylmercaptan, must be added in an amount so as to prevent inhibition of the polymerization by the MNA, crosslinking and the transformation of the active sites.

When all the constituents are combined in a reaction tube, this is placed in a thermostatted bath at 80° C. and left for 4 to 6 days in order to reach the suitable degree of conversion of the polymer. So as not to degrade the active sites during polymerization, it is important to control the temperature well.

After polymerization, the cylindrical core rod 11 has preferably a diameter $D_1$ of 5 mm. If the initial diameter is greater than this value, the rod is hot drawn in order to bring its diameter down to 5 mm.

In accordance with the process described in French Patent 2,557,495, the cylindrical rod 11 is subsequently coated by means of an optical cladding 12 made of a cladding polymer, in order to form a first preform 10 of diameter $D_2$ according to the following steps:

- this cylindrical rod is cleaned by the cladding monomer distilled in a cryogenic distillation unit,
- at the end of the distillation unit the cylindrical rod 11 is placed in a cylindrical cavity in such a way that the major axes of the rod and of the cavity are substantially coincident and the rod/cavity assembly is put under a low vacuum,
- the space existing between the internal walls of the cavity and the rod is filled with a mixture to be polymerized of the cladding polymer,
- the mixture is polymerized,
- the first preform 10 thus obtained is subsequently taken out.

Whatever the polymer chosen for forming the optical cladding, the composition of this polymer must be adapted in order to meet the numerical aperture compatible with the monomodality of the guide at the working wavelength. More precisely, the condition for monomodality restricts the normalized frequency V of the guide, which frequency is given by:

$$V = \pi d_c (n_c^2 - n_g^2)^{\frac{1}{2}}/\lambda \quad (1)$$

to being less than or equal to 2.4. In this formula, $\lambda$ is the wavelength, $n_c$ and $n_g$ are the indices of the core and of the cladding respectively and $d_c$ is the final core diameter. For a wavelength of 0.8 $\mu$m, a diameter $d_c$ of 5 $\mu$m and a core index of 1.5, the index difference $n_c - n_g$ must not exceed $5 \times 10^{-3}$.

MNA generally increases the index of the polymer to which it has been added. It may therefore be provided that the cladding polymer is identical to the core polymer, as the MNA is sufficient to achieve the necessary index difference $n_c - n_g$. It is also possible to obtain the cladding polymer by polymerization of the polymerizable core mixture, copolymerized with a monomer possessing a very low refractive index such as a fluorinated methacrylate ester, a pentafluorostyrene or a fluorinated vinyl carbonate, the amount of which is adjusted in such a way that $n_c - n_g$ has approximately the desired value.

It is advantageous for the ratio of the diameters $D_2/D_1$ to be greater or equal to 2 in order that the purified optical cladding covers the entire propagation mode. But because of the solvent effect of the monomer on the cylindrical rod 11 of diameter $D_1$, $D_2/D_1$ must be less than a certain limit: if the core polymer is polymethyl methacrylate and if the cladding polymer is a comonomer based on more than 90% of methyl methacrylate for example, $D_2/D_1$ must be less than 5.

As indicated in FIG. 1c, the first preform 10 is subsequently fitted into a first jacket 20 of internal diameter $D_2$ and of external diameter $D_5$, made of a third polymer, the so-called jacket polymer. The jacket polymers utilized must have fiber drawing and glass transition temperatures compatible with those of the core polymer. There are no particular conditions on their refractive index, as they only serve as reinforcing material. For reasons of ease of machining the first jacket 20, the ratio $D_3/D_2$ is chosen to be at least equal to 1.25.

A second preform 30 (FIG. 1d) of diameter $D_4$ is subsequently produced by partial drawing of the first jacket 20 containing the first preform 10. For the same reasons as for the diameter $D_1$, the final diameter $D_4$ is taken to be at least equal to 4 mm, for example 5 mm.

In order to obtain rods of sufficient length and of uniform diameter, it is also preferable that the reduction from $D_3$ to $D_4$ is such that $D_3/D_4 \geq 4$.

The second preform 30 is fitted in its turn (FIG. 1e) into a second jacket 40 of internal diameter $D_4$ and of external diameter $D_5$, made from a jacket polymer. The preform obtained 40 then undergoes a preparation step intended to provide means for positioning the electrodes for polarization of the electrooptically active substance. In the embodiment of FIG. 1f, said positioning means are diametrically opposed flats 41 and 42 obtained by milling the jacket 40. By way of indication, starting from an initial diameter $D_5$ of 25 mm, the milling reduces the second jacket 40 to a slab of approximately 3.6 to 11 mm in thickness. This slab is subsequently drawn into a fiber (step not shown) at temperatures of the order to 200° to 240° C. depending on the average molar mass of the polymer until the desired core diameter $d_c$, that is approximately 5 $\mu$m, is obtained. The monomode fiber thus produced has a diameter of 140 $\mu$m for a flat of thickness 20 to 60 $\mu$m. Finally, the object of a final step of the process is to produce polarization electrodes, for example by metallic evaporation under vacuum onto the flats of the monomode fiber obtained. FIG. 3 shows such a fiber equipped with its polarization and excitation electrodes.

In a variant for carrying out the process according to the invention illustrated in FIG. 1g, the means for positioning the electrodes are symmetrical holes 43, 44 pierced parallel to the axis of the second jacket 40. After fiber drawing, a conductive alloy of low melting point, such as InGa for example, is introduced into the holes in such a manner as to form the polarization electrodes.

Preferably said metallic alloy exhibits a melting point at least 20° C. and not more than 40° C. below the glass transition temperature of the cladding polymer.

Of course producing positioning means, flats 41, 42 or holes 43, 44, is not necessary if the non-linear effectiveness of the active substance is significant or if the interaction length is great. In this case, the electrodes are directly deposited onto the cylindrical external wall of the guide.

Figure 2A:
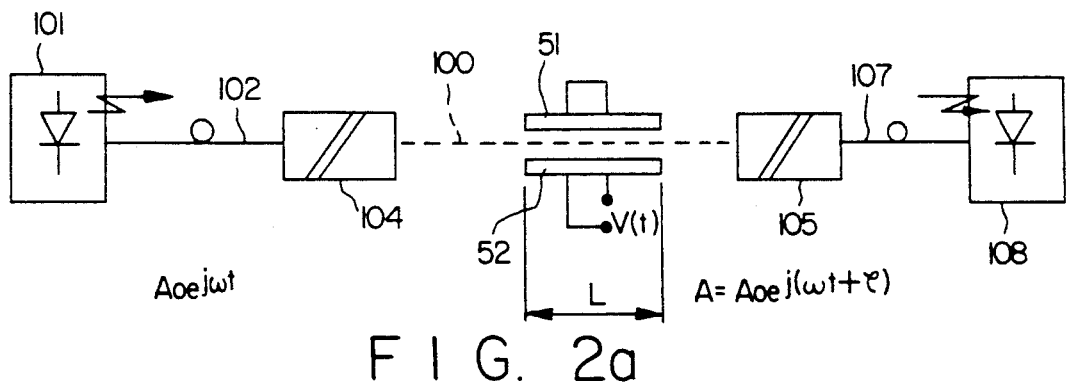
FIG. 2a is a phase modulation device comprising a source 101 emitting a wave whose amplitude is given by $$A_0 e^{j\omega t}$$

This wave is launched into a first optical fiber 102 connected, via a connector 104, to the optical waveguide 100 shown in dotted lines. As FIG. 2 indicates, the guide 100 is subjected over a length L to an electric field generated by the variable voltage V(t) applied to the electrodes 51, 52. The electrooptic effect arising from within the guide 100 produces a phase variation of the light wave, such that the amplitude of the light at the position of the photodetector 108, after transmission along the fiber 107 connected to the guide via the connector 105, is written as $$A = A_0 e^{j(\omega t + \psi)}$$

In the case of the Kerr effect, the phase shift ψ as a function of the applied electric field E(t) obeys the relationship:

$$\psi(t) = (2\pi B)LE^2(t)$$

where B is the Kerr constant which brings in the 3rd order susceptibility, $\chi^{(3)}$, of the medium.

When the predominant electrooptic effect is the Pockels effect, ψ is given by:

$$\psi(t) = (2\pi Po)LE(t)$$

Po being the Pockels constant involving the 2nd order susceptibility, $\chi^{(2)}$, of the material.

In any case the Pockels effect with these materials will be more dominant (low control voltage and high bandwidth as the electrooptic interaction length is less and as the phenomena may be purely electronic), but it requires a prior orientation of the non-linear organic groups and the stabilization of this orientation.

The Kerr effect, although less dominant, does not require this technological step and, by way of example, a few results are summarized in the table below:

|          | V (volt) | ψ (rad)            |
|----------|----------|--------------------|
| L = 10 cm | 10       | 3.5 × 10⁻³        |
|          | 150      | 0.8                |
| L = 20 cm | 10       | 7 × 10⁻³          |
|          | 100      | 0.7                |

Figure 2B:
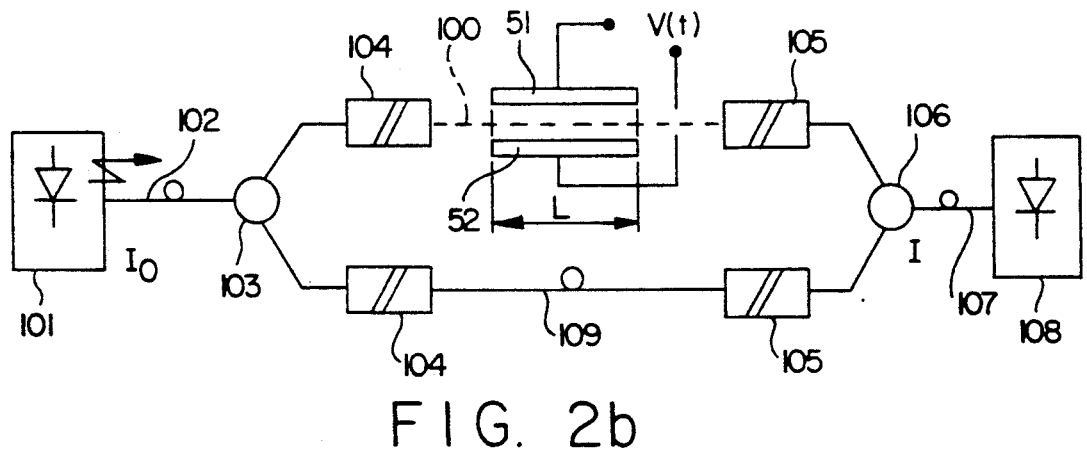
FIG. 2 shows two set-up diagrams in which an optical waveguide 100, manufactured in accordance with the process described with reference to FIG. 1, is employed in such a manner as to produce a modulation, by electrooptic effect, of a light wave transmitted along a network of optical fibers.
Figure 3:
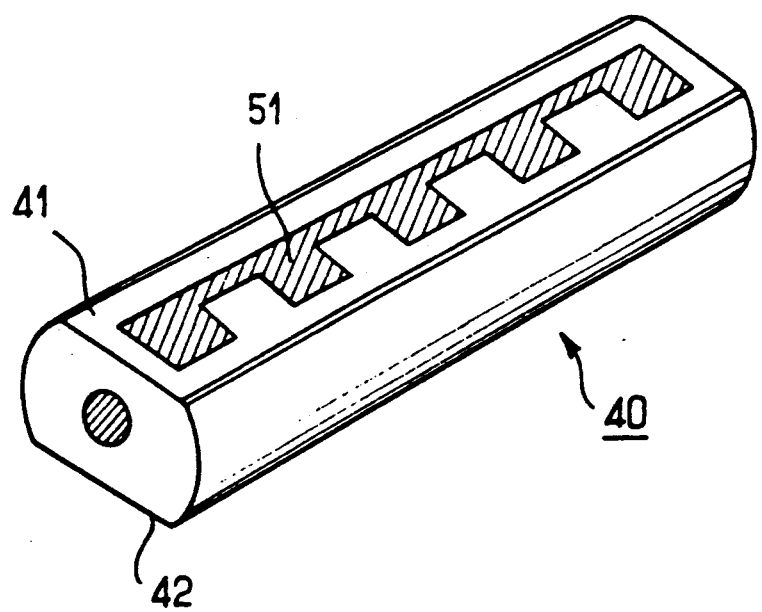

As FIG. 2b shows, the phase modulation resulting from the set-up of FIG. 2a may be transformed by intensity modulation by interference between the wave having traversed the optical waveguide 100 and a reference wave transmitted by an optical fiber 109 placed in parallel with the guide, between a first coupler 103 and a second coupler 106. The light arriving at the photodetector 108 has an intensity I related to the incident intensity Io by $$I(t) = \frac{Io}{2}[1 - \cos(2\pi BLE^2(t))] \text{ for the Kerr effect}$$

and $$I(t) = \frac{Io}{2}[1 + \cos(2\pi P_oLE(t))] \text{ for the Pockels effect.}$$

It may be seen from the preceding formulae that the effects obtained are stronger the greater the interaction length L. However, certain limitations must be imposed on the length of the guide, especially as regards the attenuation. As the latter is of the order of 0.01 dB/cm to 0.1 dB/cm for λ=0.85 μm and λ=1.32 μm, a length of 10 to 50 cm is acceptable. On the other hand, it is also necessary to take into account the bandwidth, due to the transit time of the wave which is 5 ns per meter of guide and especially due to the response time of the circuit because of the capacitive effect of the excitation device. It is then necessary to reduce the width of the electrodes.

With a view to attaining a bandwidth which is as wide as possible, it is preferable to utilize the Pockels effect rather than the Kerr effect, limited in frequency to a few megahertz. As the Pockels effect involves the 2nd order susceptibility which is attainable only in non-controsymmetric media, it is generally necessary, after having obtained the monomode fiber, to carry out a hot orientation of the molecules of the electrooptically active substance within the core, for example at 80° C. for 24 hours in polymethyl methacrylate, under an electric field of 0.5 MV/cm which is held until the return to ambient temperature. A 100% modulation may thus be obtained with an interaction length L of 10 cm, a spacing between the electrodes of 20 μm and a control voltage of 10 to 20 V, at a wavelength of 1 μm. The material thus oriented is preferably stabilized by crosslinking between the chains carrying the active molecules. This control voltage can be lowered to 2 V with polymer systems described by L. Li et al. in the article "An all fiber electrooptic Kerr modulation" which appeared in IEEE Colloquium on "Advanced fiber waveguide devices" No. 1986/79, London, May 20th 1986. Generally it is possible to obtain a low control voltage with active molecules exhibiting at the wavelength in question a 2nd order susceptibility greater than $3.3 \times 10^{-14}$ MKSA or a 3rd order susceptibility greater than $1.1 \times 10^{-19}$ MKSA.

We claim:

1. A process for manufacturing a monomode cylindrical optical waveguide made of a polymer, such a waveguide permitting a modulation, by electrooptic effect, of the light wave which it transmits, which comprises the following steps:

producing a cylindrical core rod (11) by polymerization of a polymerizable mixture comprising especially a core polymer and an electrooptically active organic substance such that the core exhibits an optical activity under the action of an external electric field, forming a first preform (10) by coating the cylindrical core rod (11) by means of an optical cladding (12) formed by a cladding polymer, fitting said first preform (10) into a first jacket (20) constituted by a jacket polymer, producing a second preform (30) by partial drawing of the first jacket (20) containing the first preform (10), fitting the second preform (30) into a second jacket (40) made of a jacket polymer, fiber drawing the second jacket (40) thus prepared until the core diameter (d$_c$) has the required dimension in order for the optical waveguide obtained to be monomode, producing electrodes (51, 52) for polarization and excitation of the electrooptically active substance.

2. The process as claimed in claim 1, wherein the fiber drawing step of the second jacket is preceded by a preparation step of said second jacket (40), intended to produce means (41, 42, 43, 44) for positioning said polarization and excitation electrodes (51, 52).

3. The process as claimed in either of claims 1 and 2, wherein the core polymer is chosen from among the following polymers: methacrylic polymers, α-haloacrylates and styrenics, carbonates and vinyl carbonates.

4. The process as claimed in any one of claims 1 and 2, wherein the cladding polymer is identical to the core polymer.

5. The process as claimed in any one of claims 1 and 2, wherein the cladding polymer is obtained by polymerization of the polymerizable core mixture, copolymerized with a monomer possessing a very low refractive index.

6. The process as claimed in claim 5, wherein said monomer possessing a very low refractive index is chosen from among the following monomers: fluorinated methacrylate ester, pentafluorostyrene, fluorinated vinyl carbonate.

7. The process as claimed in any one of claims 1 and 2, wherein the electrooptically active organic substance is composed of a molecule such that the core polymer exhibits a 3rd order susceptibility greater than $1.1 \times 1.10^{-19}$ MKSA at the wavelength in question.

8. The process as claimed in any one of claims 1 and 2, wherein, once the monomode fiber is obtained, the molecules of the electrooptically active organic substance within the core are oriented at a temperature close to the glass transition temperature of the core polymer under the action of an electric field which is subsequently held until the return to ambient temperature.

9. The process as claimed in claim 8, wherein the electrooptically active organic substance is composed of a molecule such that the core polymer exhibits, after orientation, a 2nd order susceptibility greater than $3.3 \times 10^{-14}$ MKSA at the wavelength in question.

10. The process as claimed in claim 9, wherein the orientation of said molecules is stabilized by cross-linking.

11. The process as claimed in any one of claims 1 and 2, wherein the polymerizable core mixture contains a free radical inhibiting transfer agent.

12. The process as claimed in any one of claims 1 and 2, wherein the preparation of the second jacket consists in producing two diametrically opposed flats forming said means for positioning the electrodes.

13. The process as claimed in claim 12, wherein the electrodes are deposited by metallic evaporation under vacuum onto the flats of the monomode guide obtained.

14. The process as claimed in any one of claims 1 and 2, wherein the preparation of the second jacket consists in producing two symmetrical longitudinal holes forming said means for positioning the electrodes.

15. The process as claimed in claim 14, wherein the electrodes are produced by injecting a metallic alloy into said longitudinal holes.

16. The process as claimed in claim 15, wherein said metallic alloy exhibits a melting point at least 20° C. and not more than 40° C. below the glass transition temperature of the cladding polymer.

17. A monomide cylindrical optical waveguide made of a polymer, such a guide permitting a modulation, by electrooptic effect, of the light wave which it transmits, which comprises:

a core (11) formed by a mixture comprising especially a core polymer and an electrooptically active organic substance such that the core exhibits an optical activity under the action of an external electric field, the core diameter ($d_c$) having the required dimension in order for the optical waveguide to be monomode, an optical cladding (40) made of a cladding polymer surrounding the core, said cladding polymer being obtained by polymerization of the polymerizable core mixture, copolymerized with a monomer possessing a very low refractive index, electrodes (51, 52) for polarization and excitation of the optically active substance.

18. The optical waveguide as claimed in claim 17, wherein the core polymer is chosen from among the following polymers: methacrylic, α-haloacrylate and styrenics, carbonate and vinyl carbonate polymers.

19. The optical waveguide as claimed in claim 18, wherein the cladding polymer is identical to the core polymer.

20. The optical waveguide as claimed in claim 17, wherein said monomer possessing a very low refractive index is chosen from among the following monomers: fluorinated methacrylate ester, pentafluorostyrene, fluorinated vinyl carbonate.

21. The optical waveguide as claimed in claim 17, wherein the electrooptically active organic substance is composed of a molecule such that the core polymer exhibits a 3rd order susceptibility greater than $1.1 \times 10^{-19}$ MKSA at the wavelength in question.

22. The optical waveguide as claimed in claim 17, wherein the electrooptically active organic substance is composed of a molecule such that the core polymer exhibits, after orientation, a 2nd order susceptibility greater than $3.3 \times 10^{-14}$ MKSA at the wavelength in question.

23. The optical waveguide as claimed in claim 17, wherein said electrodes are formed by metallic layers deposited onto diametrically opposed flats produced on said optical waveguide.

24. The optical waveguide as claimed in claim 17, wherein said electrodes are formed by longitudinal holes produced in the cladding polymer and filled with a metallic alloy.

25. The optical waveguide as claimed in claim 24, wherein said metallic alloy exhibits a melting point at least 20° C. and not more than 40° C. below the glass transition temperature of the cladding polymer.

* * * * *